Figure 1:
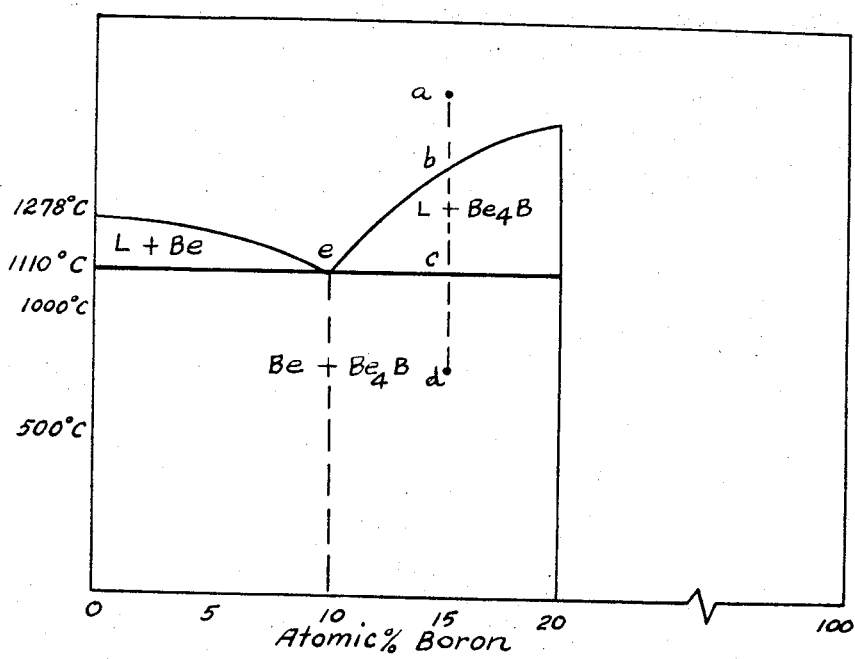

United States Patent [19]
Cline et al.

[11] 3,743,006
[45] July 3, 1973

[54] PREPARATION OF BERYLLIUM BORIDE ARMOR BY DIRECT CASTING

[75] Inventors: Carl F. Cline, Walnut Creek; Mark L. Wilkins, Pleasanton, both of Calif.

[73] Assignee: The United States of America as represented by the Secretary of the Army, Washington, D.C.

[22] Filed: Feb. 7, 1972

[21] Appl. No.: 223,840

[52] U.S. Cl..................... 164/128, 75/150, 164/120
[51] Int. Cl............................................ B22d 27/04
[58] Field of Search........................... 75/150; 2/2.5; 161/404; 164/80, 122, 125, 126, 127, 128

[56] References Cited
UNITED STATES PATENTS

| | | | |
|---|---|---|---|
| 3,174,850 | 3/1965 | Hum et al. | 75/150 |
| 3,179,553 | 4/1965 | Franklin | 2/2.5 X |
| 3,367,398 | 2/1968 | Riley et al. | 164/80 X |
| 3,452,362 | 7/1969 | Korolick et al. | 2/2.5 |
| 3,702,593 | 11/1972 | Fine | 161/404 X |

Primary Examiner—J. Spencer Overholser
Assistant Examiner—John E. Roethel
Attorney—Harry M. Saragovitz, Edward J. Kelly et al.

[57] ABSTRACT

A method of casting lightweight armor material of $Be_4B$ dispersed in a Be matrix comprising the melting of a mixture of $Be_4B$ and Be powder containing 10-20 atomic percent boron, cooling to induce a temperature gradient in the molten material, and recovering the solidified cerment.

4 Claims, 2 Drawing Figures

PREPARATION OF BERYLLIUM BORIDE ARMOR BY DIRECT CASTING

This invention relates to a method for the fabrication of a lightweight armor and more particularly to $Be_4B$ dispersed in a Be matrix wherein the cermet is prepared by a direct casting method.

Conventional composite armor consists of a ceramic facing bonded to a supporting backing. The hard ceramic blunts and shatters the projectile on impact while the backing supports the ceramic against the resulting stresses. Theoretical analysis reveals that desirable properties of a ceramic include, e.g., low density, high sound speed, high elastic modulus and hgih strength. An example of a conventional composite armor possessing all of the above-mentioned attributes is boron carbide which comprises a boron carbide ceramic facing bonded to, e.g., a glass-reinforced plastic backing.

For ease in fabrication, it would be desirable if the ceramic portion of the armor could be made directly by casting molten ceramic into a suitable mold. However, the high melting temperatures, e.g., 2000° C, of most ceramics virtually rules out casting as a feasible fabrication method. Consequently, composite armor is currently made by hot-pressing or sintering a ceramic powder and then bonding the resulting ceramic compact to a backing material such as fiberglass.

This invention relates to a lightweight personnel armor based on the beryllium-boron system. The important aspect of the invention is the realization that the existence of a particular eutetic in the Be/B system permits the direct castng of a two-pahse material consisting of $Be_4B$ crystals dispersed in a Be matrix. While this material has not been tested ballistically, theory predicts it should make an excellent facing for composite armor.

It is an object of this invention to provide and disclose a lightweight personnel armor based on the beryllium-boron system.

It is a further object of the inventon to provide and disclose a method for casting lightweight ceramic material comprising $Be_4B$ crystals dispersed in Be matrix.

Figure 2:
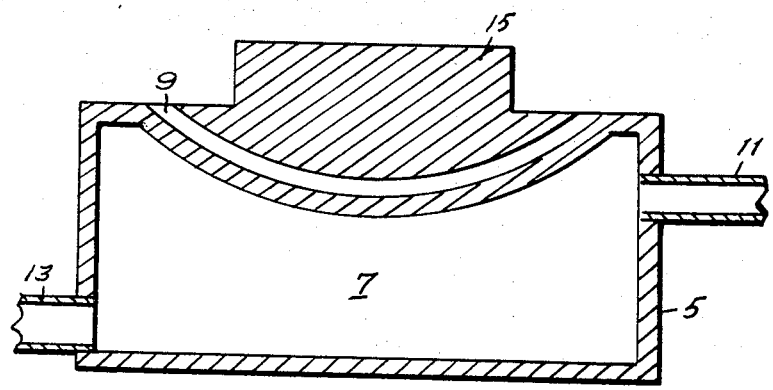

Other objects and a fuller understanding of this invention may be had by referring to the following description and claims taken in conjunction with the accompanying drawing in which:

FIG. 1 is a simplified and abbreviated phase diagram of the casting of $Be_4B$ crystals dispersed in a Be matrix FIG. 2 is an exemplary mold utilized to chill the ceramic melt.

Referring now to FIG. 1, the existence of a eutectic e (m.p. 1110° C) at 10 atomic percent boron raises the possibility of making a two-phase armor material by direct casting from the liquid state. To explain, consider the line of constant composition $abcd$ drawn in at 15 atomic percent B. At $a$, the system is entirely liquid, i.e., a liquid solution of Be containing 15 atomic percent B. As the system is cooled, solid $Be_4B$ starts coming out of solution at $b$. As the $Be_4B$ continues crystallizing out with decreasing temperature (the system is now in the region labeled L+$Be_4B$), the saturated liquid becomes richer in Be. The liquid composition thus moves along the liquidus line $be$. At $c$, the solution has the eutectic composition $e$ and is saturated with respect to the Be also, so solid Be begins to precipitate. A heat is withdrawn from the system, the amount of eutectic liquid (composition $e$) diminishes and the amounts of solid $Be_4B$ and solid Be increase. Even though heat is withdrawn from the system, the temperature remains constant at 1110° C as long as there is still some eutectic liquid remaining. Finally, the last drop of liquid solidifies and the temperature of the mixed solids decreases along line $cd$. The result is a two-phase solid consisting of $Be_4B$ crystals dispersed in a Be matrix, the overall composition of the solid being 85 atomic percent Be and 15 atomic percent B.

For purposes of illustration, the constant composition line $abcd$ is show at 15 atomic percent B in the attached Be/B phase diagram. However, $abcd$ could be fixed anywere between 10 atomic percent Be (the eutectic composition) and 20 atomic percent B (the $Be_4B$ composition). Thus, the final two-phase material can be made to have any desired composition between 10 and 20 atomic percent Be simply by cooling a Be/B solution of the same desired composition.

One of the features of the two-phase $Be_4B$/Be is that the $Be_4B$ crystals can be uniformly aligned within the Be matrix by establishing a thermal gradient along the Be/B solution as it cools. As the $Be_4B$ crystals come out of solution, they are uniformly aligned in the direction of the thermal gradient. This method is called "directional solidification" and has been utilized to produce materials having enhanced properties in a given direction. For application to armor, the structure would be oriented to provide maximum resistance to penetration. Directional solidification offers the possibility of orienting the high hardness of the ceramic phase and the ductility of the metal phase to provide the optimum material properties to defeat a ballistic impact.

To further describe the casting process, the melt for charging the molds is produced by melting together $Be_4B$ and Be powder for appropriate weight ratios (10–20 atomic percent boron over-all). The melts are prepared under a protective inert atmosphere, e.g., argon, utilizing sufficient heat to elevate the temperature above the point where all of the material is in a liquid state. The actual melting point temperature varies with the composition as shown on the phase diagram. The melt is poured into a standard mold, e.g., graphite or graphite lined with molybdenum. Directional solidification is achieved by cooling the bottom part of the mold to induce a temperature gradient in the molten material, which stimulates grain growth perpendicular to the armor surfaces. The case material's tendency to shrink and crack required employment of techniques which will inhibit cracking, e.g., chill casting, hot topping, zone refining, controlled cooling, doping the melt with metal additives such as molybdenum, copper or aluminum oxide, etc. These techniques are known in the casting art.

Referring now to FIG. 2 of the drawing, bottom component 5 of the mold system comprises hollow interior 7 and contoured segment 9. Inlet means 11 and outlet means 13 of mold 5 are utilized to conduct a cooling medium, e.g., water, through the interior of the mold. Upper component 15 is designed to be compatible with contoured segment 9 of mold 5. In operation, a doped melt is poured into the mold at a temperature in excess of the melting point, e.g., 1350° C. Upper mold part 15 is lowered to squeeze the still liquid melt to desired thickness. Coolant, e.g., water is circulated through interior segment 7 to chill and solidify the melt.

Grain sizes and porosity are important factors in the production of an effective ceramic. The ballistic performance of the ceramic materials is generally an inverse function of these parameters. The $Be_4B/Be$ cermets can be used to make graded armor by varying the Be concentration along the depth demensions of the armor.

Although we have described our invention with a certain degree of particularity, we wish it to be understood that we do not desire to be limited to the exact details of fabrication shown and described for obvious modifications will occur to a person skilled in the art.

Having described our invention, we claim:

1. A method of casting a light weight armor material of $Be_4B$ dispersed in a Be matrix comprising the melting of a mixture of $Be_4B$ and Be powder containing 10–20 atomic percent boron, cooling to induce a temperature gradient in the molten material, and recovering solidified cermet.

2. A method in accordance with claim 1 wherein the mixture contains atoub 10 atomic percent boron.

3. A method in accordance with claim 1 wherein the mixture contains about 15 atomic percent boron.

4. A method in accordance with claim 1 wherein the mixture contains about 20 atomic percent boron.

* * * * *